(12) United States Patent
Winter et al.

(10) Patent No.: US 8,757,307 B2
(45) Date of Patent: Jun. 24, 2014

(54) BRAKING STRATEGY FOR A HYBRID DRIVE OF A VEHICLE

(75) Inventors: Thomas Winter, Freilberg am Neckar (DE); Jochen Fassnacht, Justinus-Kern (DE); Nicole Weber, Schwieberdingen (DE); Kay Hindorf, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 1222 days.

(21) Appl. No.: 12/282,745

(22) PCT Filed: Mar. 9, 2007

(86) PCT No.: PCT/EP2007/052228
§ 371 (c)(1),
(2), (4) Date: Mar. 4, 2009

(87) PCT Pub. No.: WO2007/107462
PCT Pub. Date: Sep. 27, 2007

(65) Prior Publication Data
US 2009/0321160 A1 Dec. 31, 2009

(30) Foreign Application Priority Data
Mar. 21, 2006 (DE) .......................... 10 2006 012 859

(51) Int. Cl.
*B60W 10/04* (2006.01)
*B60W 10/06* (2006.01)
*B60W 10/08* (2006.01)

(52) U.S. Cl.
USPC .................................. 180/65.28; 180/65.285

(58) Field of Classification Search
USPC .......................................... 180/65.21–65.29
See application file for complete search history.

(56) References Cited

U.S. PATENT DOCUMENTS

| 5,993,351 A | 11/1999 | Deguchi et al. |
| 6,569,055 B2 * | 5/2003 | Urasawa et al. ................... 477/5 |
| 7,174,980 B2 * | 2/2007 | Hoetzer et al. ........... 180/65.245 |
| 7,363,122 B2 | 4/2008 | Bischoff |
| 7,657,438 B2 * | 2/2010 | Obayashi et al. .............. 705/1.1 |
| 2002/0094908 A1 | 7/2002 | Urasawa et al. |
| 2005/0182526 A1 | 8/2005 | Hubbard et al. |
| 2007/0157899 A1 | 7/2007 | Seufert et al. |

FOREIGN PATENT DOCUMENTS

| DE | 10202531 | 8/2003 |
| EP | 1160119 | 12/2001 |
| JP | 2002213266 | 7/2002 |
| WO | WO 2005/100777 | 10/2005 |

OTHER PUBLICATIONS

International Search Report, PCT International Patent Application No. PCT/EP2007/052228, dated Aug. 8, 2007.

* cited by examiner

*Primary Examiner* — Jeffrey J Restifo
*Assistant Examiner* — Erez Gurari
(74) *Attorney, Agent, or Firm* — Kenyon & Kenyon LLP

(57) ABSTRACT

Method for operating a hybrid drive, in particular a parallel hybrid drive, of a vehicle. The parallel hybrid drive includes an internal combustion engine and at least one electric drive, at least one energy storage device, and a vehicle transmission. During deceleration phases in which a torque required on the transmission input side is present, the internal combustion engine is operated either in drag mode or at a minimum drive torque.

14 Claims, 3 Drawing Sheets

BRAKING STRATEGY FOR A HYBRID DRIVE OF A VEHICLE

BACKGROUND INFORMATION

A method for controlling a hybrid drive of a vehicle is described in German Patent Application No. DE 102 02 531 A1. The hybrid drive includes an internal combustion engine and at least one electric machine as drive machines. The drive shafts of the drive machines may be connected to a drive train of the vehicle, and when there is a negative torque requirement (braking) on the drive train of the vehicle, the at least one electric machine is activated in the generator mode based on a characteristics map. The at least one electric machine is activated as a function of a setpoint braking torque $M_{A,setpoint}$ and a vehicle velocity v. The activation is performed by a regeneration strategy block which receives the necessary signals via an interface and which has function modules which generate the control signals for the at least one electric machine. According to the method described in German Patent Application No. DE 102 02 531 A1, a brake module selector is provided which optionally activates different operating modes for the braking as a function of signals present at the interface, the operating modes including strictly regenerative braking, combined regenerative and mechanical braking, and strictly mechanical braking.

Vehicles having a hybrid drive are characterized in that they have at least two different drive units. It is most common for a spark-ignition internal combustion engine to be combined with at least one electric machine, thus providing various possibilities for conserving energy. A parallel hybrid drive having one or two clutches represents one type of coupling of the two drive units. In the parallel hybrid drive, the internal combustion engine and the electric machine are provided in such a way that the entire drive torque results from the sum of the particular individual torques, except for the power requirement of the auxiliary units. A disconnect-type clutch is generally situated between the at least two drive units and the vehicle transmission.

The rotational speeds of the internal combustion engine and the at least one electric machine are generally linked. In this manner, for limited time periods which depend on the battery used for the at least one electric drive, hybrid driving may be performed in which the at least one battery for the at least one electric drive of the parallel hybrid drive is discharged. On the other hand, the parallel hybrid drive offers the possibility of charging the at least one battery, using the at least one electric machine, at a higher torque of the internal combustion engine than is actually required at the transmission input. For a drive train configuration having a clutch, the drag torque of the internal combustion engine which must be continually overcome would be in conflict with a strictly electric driving mode, but this could be avoided by using a second disconnect-type clutch between the internal combustion engine and the at least one electric drive. However, this is not favored due to the high level of additional mechanical and design complexity for an additional clutch between the internal combustion engine and the at least one electric drive.

Using a parallel hybrid drive, it is possible to convert kinetic energy to electrical energy during braking, and to feed the electrical energy to the at least one battery by recuperation. Because of the lack of a second disconnect-type clutch between the internal combustion engine and the at least one electric drive, or in situations in which a second disconnect-type clutch is present and the internal combustion engine should not be switched off, during a braking phase it is possible to feed electrical energy only as long as the rotational speed of the internal combustion engine, which is a function of the driving speed and the gear ratio, is greater than the minimum rotational speed of the internal combustion engine, so that for drive trains having two or more disconnect-type clutches, the disconnect-type clutch(es) may remain engaged. In that case, the braking torque applied by the drive train is composed of drag torque $M_{drag}$ of the internal combustion engine and the torque absorbed by the at least one electric machine operated in generator mode.

SUMMARY

An object of the present invention is to provide an operating strategy for a hybrid drive which also takes into consideration the case in which the magnitude of the required braking torque is less than the magnitude of drag torque $M_{drag}$ present at the internal combustion engine of a hybrid drive.

This object may be achieved according to the present invention in that an energy-optimized operating point is specified at low required braking torques, thereby ensuring that optimal use is made of the recuperation potential that is present. By making optimal use of the recuperation potential of a hybrid drive, in this specific driving range of a vehicle having a hybrid drive, in particular during braking, it is possible to reduce the fuel consumption. Although the operating range under consideration represents only a small portion of the states assumed by the drive within the driving cycles that occur, situations are possible in which the provided operating/braking strategy has a positive effect. One example is slow-moving traffic, such as on a slightly downward sloping roadway, in which the intensity of required braking is less than the intrinsic deceleration resulting from the spark-ignition internal combustion engine on account of engine drag torque $M_{drag}$.

The operating or braking strategy provided according to the present invention becomes active when a required transmission input torque $T_{GE,gef}$ is less than 0 and greater than drag torque $T_{VB,drag}$ generated by the internal combustion engine. The decision which must be made by the braking strategy takes into account two possible operating modes of the internal combustion engine of a hybrid drive. Either the internal combustion engine is in drag mode, characterized by drag torque $T_{VB,drag}$ applied by the internal combustion engine, or the internal combustion engine provides its minimum drive torque $T_{VB,min}$, which is greater than 0, without adjustment of the ignition angle. For spark-ignition internal combustion engines, such as an Otto engine, for example, it is not meaningful to set a torque which has a value between 0 and the value of minimum drive torque $T_{VB,min}$, since in this range the quantity of injected fuel is held constant. In this case, a reduction in torque is achieved only by adjusting the ignition angle.

Depending on the decision that is made within the braking strategy, the at least one electric drive is adapted to one of the operating modes described above.

If the internal combustion engine is in drag mode, the at least one electric drive compensates for the excessive braking torque by the fact that the at least one electric machine acts as an engine and applies a torque $T_{EM,1}=T_{GE,gef}-T_{VB,drag}>0$.

On the other hand, when the internal combustion engine provides its minimum drive torque $T_{VB,min}$ without the ignition angle being adjusted, in addition to the required braking torque this torque, i.e., $T_{VB,min}$, is also used for charging the at least one battery of the vehicle having a hybrid drive. In this operating mode the at least one electric drive is operated in generator mode and absorbs torque $T_{EM,2}=T_{GE,gef}-T_{VB,min}<0$.

The purpose of the braking strategy is to decide which of the two variants of the operating mode is more favorable with regard to energy.

BRIEF DESCRIPTION OF THE DRAWINGS

Example embodiments of the present invention is described in greater detail below with reference to the figures.

DETAILED DESCRIPTION OF EXAMPLE EMBODIMENTS

Figure 1:
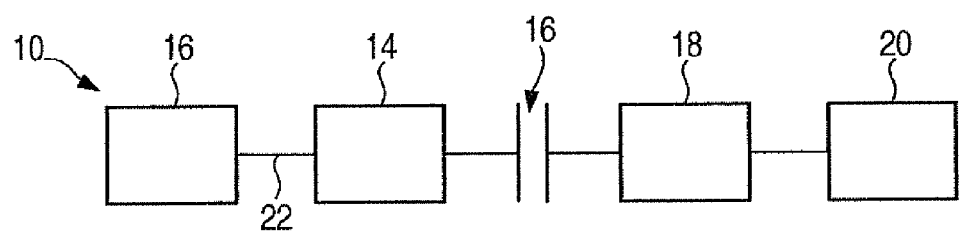
FIG. 1 shows the structure of a parallel hybrid drive having an internal combustion engine, an electric drive, and a clutch.

FIG. 1 illustrates the structure of a hybrid drive, in particular a parallel hybrid drive, for a vehicle.

A hybrid drive 10, in particular a parallel hybrid drive, includes an internal combustion engine 12 and at least one electric drive 14. Whereas internal combustion engine 12 and the at least one electric drive 14 are connected to one another via a coupling 22, the at least one electric drive 14 may be disconnected from a vehicle transmission 18 via a disconnect-type clutch 16. A drive train 20 of the vehicle, schematically indicated in FIG. 1, is provided downstream from vehicle transmission 18.

Figure 2:
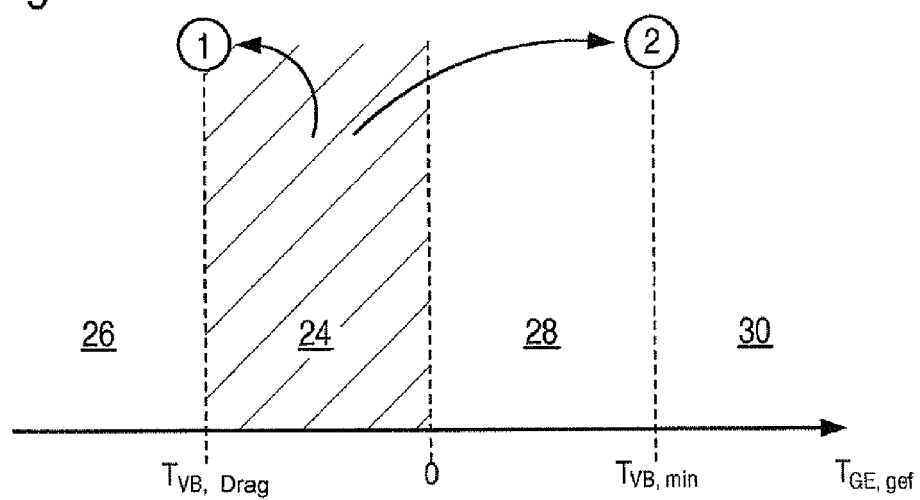
FIG. 2 shows the illustration of a braking range plotted with respect to a torque required at the transmission input, with two decision options.

FIG. 2 illustrates a braking strategy, plotted with respect to a torque required at the transmission input of the vehicle, within which switching is performed within various operating modes.

FIG. 2 shows that a brake function block 44 (compare to the illustration according to FIG. 5) within a braking range 24 branches to a first operating mode ("drag mode") or to a second operating mode (2). This is a function of torque $T_{GE,gef}$ required at the transmission input. Brake function block 44 illustrated in FIG. 5 becomes active when required transmission input torque $T_{GE,gef}$ becomes less than 0, i.e., when a braking operation is present, and is greater than drag torque $T_{VB,drag}$ of internal combustion engine 12. Thus, the condition for application of a braking strategy is as follows:

$$T_{VB,drag} < T_{GE,gef} < 0$$

The decision which must be made by brake function block 44 with regard to the braking strategy takes place between two possible operating modes of internal combustion engine 12 of a hybrid drive, in particular a parallel hybrid drive 10. Either internal combustion engine 12 is in drag mode, illustrated by (1) in FIG. 2, or internal combustion engine 12 provides its minimum drive torque $T_{VB,min} > 0$ without adjustment of the ignition angle. For spark-ignition internal combustion engines it is not meaningful to provide a torque which has a value between 0 and $T_{VB,min}$, i.e., the minimum drive torque of internal combustion engine 12, since in this range the injection quantity is held constant, and the torque may be reduced only by adjusting the injection angle. This non-meaningful range is identified by reference numeral 28 in the illustration according to FIG. 2. The drag mode of internal combustion engine 12 is indicated by reference numeral 26, and an operating range in which the internal combustion engine provides a drive, i.e., the drive region of internal combustion engine 12, is identified by reference numeral 30 in FIG. 2, in which torque $T_{GE,gef}$ required at the transmission input exceeds minimum drive torque $T_{VB,min}$ of internal combustion engine 12.

Figure 3:
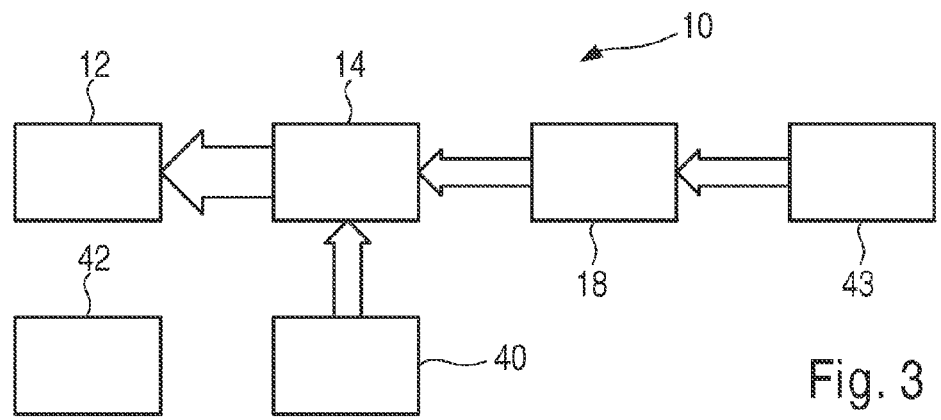
FIG. 3 shows the resulting power flow within a hybrid drive vehicle having an internal combustion engine operated in drag mode and an electric drive operated in engine mode.
Figure 4:
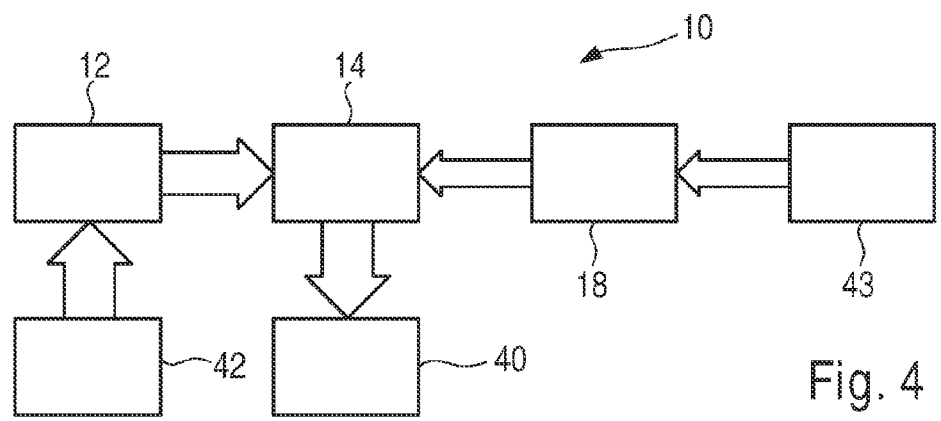
FIG. 4 shows the resulting power flow within a hybrid drive vehicle having an internal combustion engine operated at minimum drive torque and an electric drive operated in generator mode.

FIGS. 3 and 4 illustrate power flows in the drive train of a hybrid drive vehicle.

Depending on whether the internal combustion engine is operated in drag mode (1) or at its minimum drive torque $T_{VB,min}$, illustrated by (2), the at least one electric drive adapts to the particular operating variant of internal combustion engine 12.

According to drag mode of operating mode (1), drag torque $T_{VB,drag}$ of internal combustion engine 12 is less than 0, whereas the at least one electric drive is operated in engine mode and provides a torque $T_{EM,1}$ greater than 0. The resulting power flow in the drive train of the hybrid drive vehicle is illustrated in FIG. 3. In drag mode (1) a torque is transmitted to the at least one electric drive 14 via vehicle 43 and transmission 18. The at least one electric drive 14 compensates for the difference in the braking torque of internal combustion engine 12 which acts in drag operating mode (1) by the fact that the at least one electric drive 14 acts as an engine and applies torque $T_{EM,1} = T_{GE,gef} - T_{VB,drag} > 0$. As shown by the power flow according to FIG. 3 for the drag mode (1) variant, the at least one electric drive 14 drives the at least one internal combustion engine 12 and receives power from energy storage component 40. There is no connection between internal combustion engine 12, operated in drag mode (1), and a fuel tank 42 of vehicle 43; i.e., there is no "power flow" from fuel tank 42 to internal combustion engine 12 of hybrid drive 10.

In operating mode (2), in which internal combustion engine 12 is operated at minimum drive torque $T_{VB,min}$, the resulting power flow illustrated in FIG. 4 is established in the drive train of the hybrid drive vehicle. Whereas internal combustion engine 12 is operated at minimum drive torque $T_{VB,min} > 0$, the at least one electric drive 14 is operated in generator mode and provides a torque $T_{EM,2} < 0$. In this case internal combustion engine 12 provides its minimum drive torque $T_{VB,min}$ without adjustment of the ignition angle. This results in a "power flow" from fuel tank 42 to internal combustion engine 12, and a power flow from the internal combustion engine to the at least one electric drive 14. In the operating phase identified by "2," the vehicle and vehicle transmission 18 likewise provide a partial torque to the at least one electric drive 14, so that the at least one electric drive 14, which in this case is operated in generator mode, charges the at least one energy storage component 40 of vehicle 43. The torques which act on the at least one electric drive 14 are used to charge the at least one energy storage means 40 according to the resulting power flow illustrated in FIG. 4. In this case the at least one electric drive absorbs torque $T_{EM,2} = T_{GE,gef} - T_{VB,min} < 0$.

Figure 5:
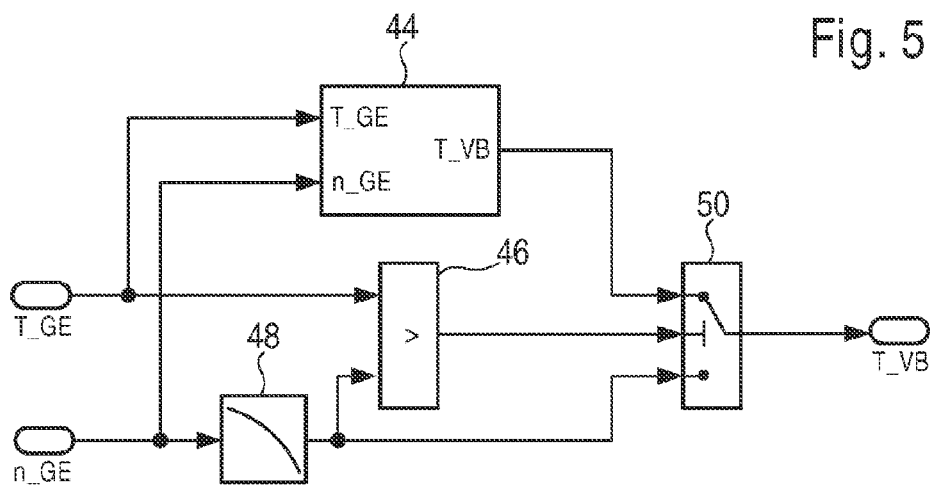
FIG. 5 shows input variables of a braking function block and the determination of the torque of the internal combustion engine as a function of the transmission input torque and the rotational speed present at the transmission input.

The purpose of brake function block 44 illustrated in FIG. 5 is to decide which of the two operating modes of internal combustion engine 12, whose resulting power flows in the drive train are shown in FIGS. 3 and 4, is more favorable with regard to energy. As a criterion to this end the costs may be defined, and may be computed and compared for both possible operating modes (1), (2). In the equations described below the efficiencies may be initially disregarded; the efficiencies are taken into account in the characteristics maps in the block flow diagrams according to FIGS. 5 and 6.

The illustration according to FIG. 5 is a circuit diagram for implementing the braking strategy illustrated in FIG. 2, taking into account the operating mode of the internal combustion engine of the hybrid drive.

FIG. 5 shows that parameter $T_{GE}$, i.e., the torque at the transmission input, and $n_{GE}$, the rotational speed at the transmission input, are used as input variables. Signals corresponding to these two parameters are fed to the inputs of brake function block 44, and in this manner the braking strategy is determined (compare to reference numeral 24 in FIG. 2). Signal T_GE, which corresponds to the torque required at the transmission input, is sent to a comparison step 46, and on the input side the signal corresponding to rotational speed n_GE at the transmission input is sent to a drag torque characteristics map 48. The resulting value for the drag torque is then transmitted to comparison step 46. In comparison step 46 the value of torque T_GE at the transmission input is compared to the value of drag torque $T_{VB,drag}$ of the internal combustion engine determined from a set of drag torque characteristic curves 48. A value for setpoint torque $T_{VB}$ of internal combustion engine 12 is determined in brake function block 44 on the basis of signals T_GE and n_GE present at that location on the input side. This value is sent to a switch 50 on the input side, to which the value originating from comparison step 46 and resulting from a comparison of signals T_GE and $T_{VB,drag}$ is delivered. Required transmission input torque T_GE and drag torque $T_{VB,drag}$ of internal combustion engine 12 are compared in comparison step 46. Comparison step 46 provides the value "true" or "false." If condition T_GE>T_VB_drag is satisfied, i.e., is true, the upper input is switched through at switch 50, and braking strategy 24 is thereby used, or otherwise the lower input is switched through; i.e., internal combustion engine 12 basically runs in drag mode.

In addition, the value determined from drag torque characteristics map 48 for internal combustion engine 12, corresponding to signal n_GE for the rotational speed at the transmission input, is relayed to switch 50. Switch 50 switches through the signal for the setpoint torque of internal combustion engine 12, i.e., T_VB, determined at brake function block 44 in the event that torque T_GE present on the input side at transmission 18 is greater than drag torque $T_{VB, drag}$ of internal combustion engine 12.

Figure 6:
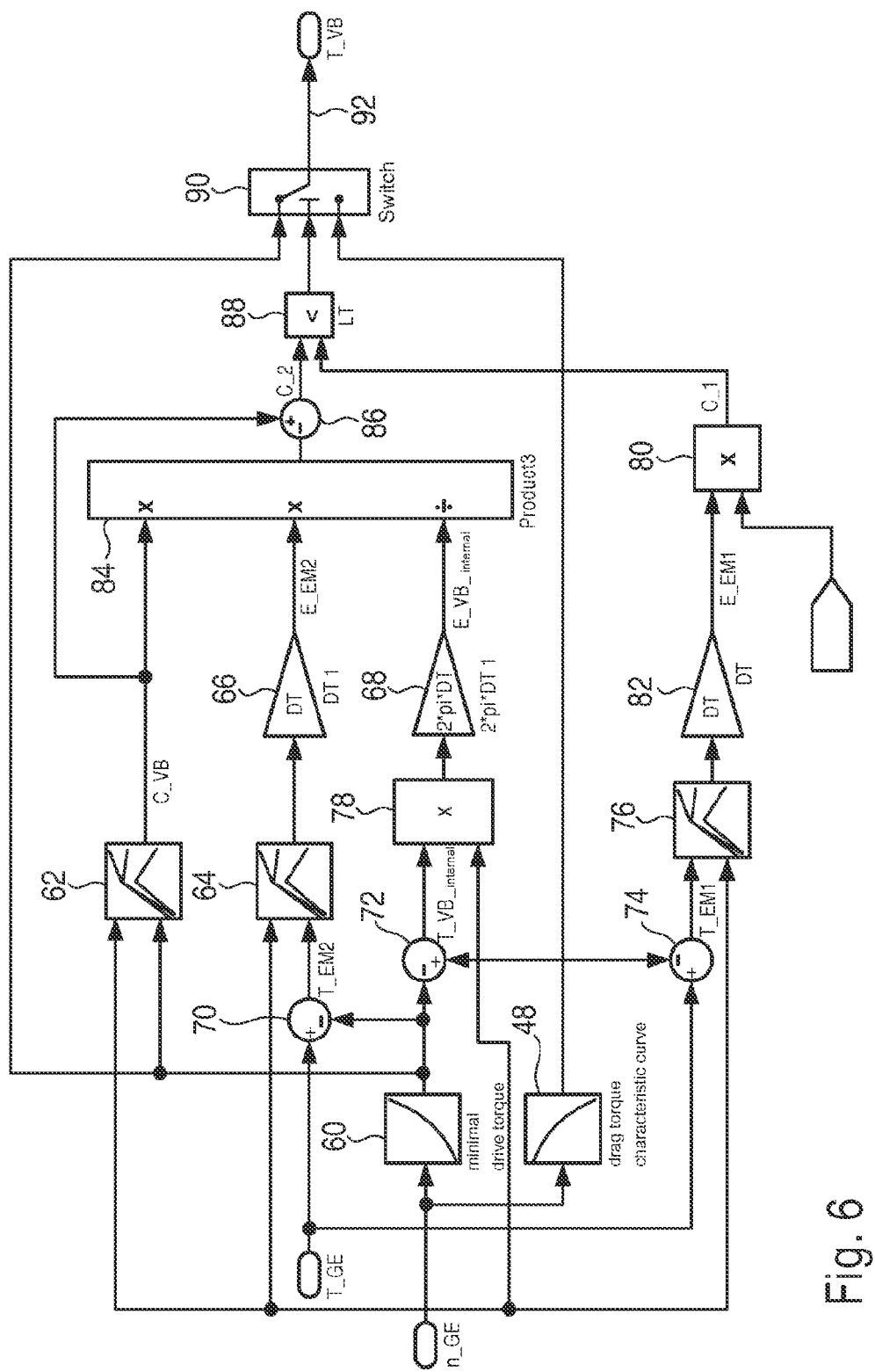
FIG. 6 shows a signal flow diagram for implementing the operating strategy in the braking range illustrated in FIG. 2, using the input variable torque at the transmission input, the rotational speed at the transmission input, and the setpoint torque of the internal combustion engine as output variables.

FIG. 6 illustrates a signal flow diagram having T_GE, the transmission input torque, and n_GE, the rotational speed at the transmission input, as input parameters, as well as output signal T_VB for the setpoint torque of the internal combustion engine of the hybrid drive.

The illustration according to FIG. 6 is a signal flow diagram for the implemented braking strategy, required torque $T_{GE,gef}$ at the transmission input and rotational speed $n_{GE}$ at the transmission input being present on the input side, and a default setpoint torque $T_{VB}$ for the internal combustion engine being ascertained on the output side.

The illustration according to FIG. 6 shows that signal $n_{GE}$ corresponding to the rotational speed at the transmission input is fed to a set of characteristic curves for minimum drive torque $T_{VB,min}$ 60 and to a set of characteristic curves 48 for the drag torque characteristic curve. This signal is also fed to characteristics maps 64 or 76 for the at least one electric drive 14 for generator mode and for engine mode, respectively.

Signal $n_{GE}$ is also sent to a consumption characteristics map for internal combustion engine 12. Transmission input torque $T_{GE}$ required at vehicle transmission 18 is fed to a third summation point 74 and to a first summation point 70. Minimum drive torque $T_{VB,min}$, which is determined from the set of characteristic curves 60 and corresponds to rotational speed signal n_GE, on the one hand is directly fed to a switch 90, and on the other hand, with a negative algebraic sign, is transmitted to first summation point 70. Information T_EM2 stands for the torque which is absorbed by the at least one electric drive 14 in generator mode, for the case that the internal combustion engine is operated at minimum drive torque. The value for minimum drive torque $T_{VB,min}$ determined from characteristics map 60 is also present, with a negative algebraic sign, at a second summation point 72. A value T_EM1 for the torque of the at least one electric drive 14 in engine mode is determined at third summation point 74, using the value present on the input side for required torque $T_{GE}$ and drag torque $T_{VB,drag}$ of internal combustion engine 12 determined from characteristic curve 48. This value is fed to characteristics map 76 for the at least one electric drive 14, which is operated in engine mode. Value E_EM1 for the energy drawn from electric machine 14 in engine mode is determined from this characteristics map 76, with connection of a third multiplication step 82. $C_{Batt}$ denotes the cost of the energy drawn from the at least one energy storage means 40, which indicates the life cycle of the at least one energy storage means 40, in which $C_{Batt}$ takes into account the battery cycles with regard to drive and braking operations as well as the charging and discharging operations.

$$C_{Batt} = \frac{C_{Batt,alt} \cdot E_{Batt,alt} + C_{Batt,L} \cdot E_{Batt,L}}{E_{Batt,alt} + E_{Batt,L}}$$

Where $C_{Batt,alt}$: average energy cost before a charging operation
$E_{Batt,alt}$: quantity of energy in the battery before a charging operation
$C_{Batt,L}$: average energy cost during a charging operation
$E_{Batt,L}$: quantity of energy fed into the battery during a charging operation Thus, the cost of operating the battery is variable, and is adapted to the history of production of the energy stored in the battery. The average energy cost during a charging operation $C_{Batt,L}$ is specified by the additional consumption of internal combustion engine 12 at the corresponding operating point. Thus, for example, for operation in strictly recuperation mode with drag mode for internal combustion engine 12 this results in an average energy cost of zero, since internal combustion engine 12 generates no costs. Internal energy $E_{VB,internal}$ of internal combustion engine 12, i.e., overcoming the drag torque and providing the external torque, represents the maximum quantity of energy that can be recuperated.

A value for stored energy E_EM2 is ascertained from characteristics map 64 for the at least one electric machine 14, which is operated in generator mode, with a first multiplier 66 being connected in between, and this value is present on the input side at gating step 84. From value T_VB_internal and signal n_GE a first multiplier 78 uses a second multiplier 68 to determine internal energy $E_{VB,internal}$ of the internal combustion engine, which likewise is present on the input side at gating step 84. T_VB_internal denotes the internal torque of internal combustion engine 12. This represents the torque which internal combustion engine 12 would provide if it were free of losses due to friction. The internal torque of internal combustion engine 12 is computed from the difference between the actual drive torque (positive) and the drag torque (negative). The negative value of T_VB_internal is used in the computation according to the following relationship:

$$T\_VB\_internal = T\_VB,drag - T\_VB,min$$

The drag torque resulting from characteristics map 48 for the drag torque characteristic curve is present at switch 90 on the input side.

At comparator 88, costs $C_2$ which are determined at fourth summation point 86 and which take into account operation of the at least one electric drive 14 in generator mode are compared to costs $C_1$ which take into account operation of the at least one electric drive 14 in engine mode, and are transmitted to switch 90. The comparison of costs $C_2$ with costs $C_1$ in comparator 88 ultimately forms the basis of the decision by braking strategy 24 concerning which operating mode of internal combustion engine 12, i.e., drag mode (1) or operation at minimum drive torque $T_{VB,min}$ (2), is more favorable economically.

Multiplications are performed in multipliers 66, 68, and 82, using a time increment DT, to arrive at the energy efficiencies.

What is claimed is:

1. A method for operating a parallel hybrid drive of a vehicle including an internal combustion engine, at least one electric drive, at least one energy storage device, and a vehicle transmission, the method comprising:
   during a deceleration phase in which a torque required on an input side of the transmission is less than zero, obtaining a value of the torque required; and
   based on the obtained value of the torque required, calculating energy costs respectively associated with a first mode combination and a second mode combination, wherein in each mode combination, operating modes are selected for the internal combustion engine and for the at least one electric drive;
   comparing the energy cost of the first mode combination to the energy cost of the second mode combination; and
   based on the comparison, selecting either the first mode combination or the second mode combination;
   wherein in the first mode combination, the internal combustion engine is selected to be operated in a drag mode, and wherein in the second mode combination, the internal combustion engine is selected to be operated in a minimum drive torque mode;
   wherein in the first mode combination, the at least one electric drive is selected to be operated in an engine mode in which the at least one electric drive provides a positive torque,
   wherein in the second mode combination, the at least one electric drive is selected to be operated in a generator mode in which the at least one electric drive charges the at least one energy storage device, and
   wherein the comparison is based on $C_1 = E_{EM,1} \cdot C_{Batt}$,
wherein:
   $C_1$: cost of drawing energy from the energy storage device;
   $E_{EM,1}$: energy drawn from the electric machine in engine mode;
   $C_{Batt}$: energy cost;
   and of energy fed to the at least one energy storage device based on $$C_2 = C_{VB} - E_{EM,2} \cdot \frac{C_{VB}}{E_{VB,internal}},$$

and
wherein:
   $C_2$: cost of fed energy;
   $E_{EM,2}$: energy fed to the energy storage device when the electric machine is operated in generator mode;
   $C_{VB}$: drive energy of the internal combustion engine; and
   $E_{VB,internal}$: internal energy of the internal combustion engine.

2. The method as recited in claim 1, wherein in the first mode combination, the at least one electric drive is selected to be operated in the engine mode, in which the at least one electric drive provides a positive torque.

3. The method as recited in claim 1, wherein in the second mode combination, the at least one electric drive is selected to be operated in the generator mode, in which the at least one electric drive charges the at least one energy storage device.

4. The method as recited in claim 2, wherein the at least one electric drive in engine mode applies a torque $$T_{EM,1} = T_{GE,gef} - T_{VB,drag} > 0,$$

wherein
   $T_{EM,1} \triangleq$ torque of the electric machine in engine mode;
   $T_{GE,gef} \triangleq$ torque required on the input side of the transmission; and
   $T_{VB,drag} \triangleq$ drag torque of the internal combustion engine.

5. The method as recited in claim 3, wherein the at least one electric drive in generator mode provides a torque $$T_{EM,2} = T_{GE,gef} - T_{VB\,min} < 0,$$

wherein
   $T_{EM,2} \triangleq$ torque of the electric machine in generator mode;
   $T_{GE,gef} \triangleq$ torque required on the input side of the transmission; and
   $T_{VB,min} \triangleq$ minimum drag torque of the internal combustion engine.

6. The method as recited in claim 1, wherein a factor $C_{Batt}$ takes into account charge and discharge cycles of the at least one energy storage device.

7. The method as recited in claim 1, further comprising:
   calculating the energy costs based on costs associated with operating the at least one electric drive in each of the first mode combination and the second mode combination;
   wherein the less costly of the first mode combination and the second mode combination is selected.

8. The method as recited in claim 1, further comprising:
   calculating the energy costs based on costs associated with operating the at least one electric drive in an engine mode in which the at least one electric drive provides a positive torque and operating the at least one electric drive in a generator mode in which the at least one electric drive charges the at least one energy storage device;
   wherein in the first mode combination, the at least one electric drive is operated in the engine mode;
   wherein in the second mode combination, the at least one electric drive is operated in the generator mode; and
   wherein the less costly of the first mode combination and the second mode combination is selected.

9. The method as recited in claim 8, wherein the costs of operating the at least one electric drive include a cost of generating the positive torque using the at least one electric device and a cost of charging the at least one energy storage device using the at least one electric device.

10. A method for operating a parallel hybrid drive of a vehicle including an internal combustion engine, at least one electric drive, at least one energy storage device, and a vehicle transmission, the method comprising:

operating the internal combustion engine either in drag mode or at a minimum drive torque during deceleration phases in which a torque required on an input side of the transmission is present, wherein a braking strategy implemented within a brake function ascertains a more favorable variant, with regard to energy, of operating the internal combustion engine in drag mode or at the minimum drive torque based on a cost comparison of drawing energy for drag of the internal combustion engine based on:

$$C_1 = E_{EM,1} \cdot C_{Batt}$$

wherein $C_1$: cost of drawing energy from the energy storage device;
$E_{EM,1}$: energy drawn from the electric machine in engine mode;
$C_{Batt}$: energy cost;

and of energy fed to the at least one energy storage device based on $$C_2 = C_{VB} - E_{EM,2} \cdot \frac{C_{VB}}{E_{VB,internal}}$$

wherein $C_2$: cost of fed energy;
$E_{EM,2}$: energy fed to the energy storage device when the electric machine is operated in generator mode;
$C_{VB}$: drive energy of the internal combustion engine; and
$E_{VB,internal}$: internal energy of the internal combustion engine.

11. The method as recited in claim 10, wherein the energy $E_{EM,2}$ fed to the at least one energy storage device is ascertained according to the relationship $$T_{EM,2} \cdot 2\pi \cdot n_{GE} \cdot \Delta t = E_{EM,2}$$

and the internal energy of the internal combustion engine is ascertained according to the relationship $$E_{VB,internal} = (T_{VB,drag} - T_{VB,min}) \cdot 2\pi \cdot n_{GE} \cdot \Delta t$$

wherein $T_{EM,2}$: torque of the electric machine in generator mode;
$n_{GE}$: rotational speed on the input side of the transmission;
$T_{VB,drag}$: drag torque of the internal combustion engine; and
$T_{VB,min}$: minimum drive torque of the internal combustion engine.

12. The method as recited in claim 10, wherein factors $C_1$ and $C_2$ present on the input side are compared in a comparison step, factors $C_{VB}$, $E_{EM,2}$, and $E_{VB,internal}$ being transmitted by a gating step to a fourth summation point, to which the cost factor $C_{VB}$ for the drive energy of the internal combustion engine, with a positive algebraic sign, is sent, and a product formed from $E_{EM,1}$ and $C_{Batt}$ is present in a second multiplier.

13. A method for operating a parallel hybrid drive of a vehicle including an internal combustion engine, at least one electric drive, at least one energy storage device, and a vehicle transmission, the method comprising:

during a deceleration phase in which a torque required on an input side of the transmission is less than zero, obtaining a value of the torque required;

based on the obtained value of the torque required, selecting an operation mode for the internal combustion engine, wherein the selected operation mode is either a drag mode or a minimum drive torque mode;

wherein the selecting of the operation mode for the internal combustion engine is triggered in response to determining $T_{VB,drag} < T_{GE,gef} < 0$, $T_{VB,drag}$ being the drag torque of the internal combustion engine, and $T_{GE,gef}$ being the torque required on the input side of the transmission; and implementing a braking strategy by ascertaining a more favorable variant, with regard to energy, of operating the internal combustion engine in the drag mode or at the minimum drive torque mode based on a cost comparison of drawing energy for drag of the internal combustion engine, wherein the comparison is based on:

$$C_1 = E_{EM,1} \cdot C_{Batt}$$

wherein:

$C_1$: cost of drawing energy from the energy storage device;
$E_{EM,1}$: energy drawn from the electric machine in engine mode;
$C_{Batt}$: energy cost;

and of energy fed to the at least one energy storage device based on $$C_2 = C_{VB} - E_{EM,2} \cdot \frac{C_{VB}}{E_{VB,internal}},$$

and
wherein:

$C_2$: cost of fed energy;
$E_{EM,2}$: energy fed to the energy storage device when the electric machine is operated in generator mode;
$C_{VB}$: drive energy of the internal combustion engine; and
$E_{VB,internal}$: internal energy of the internal combustion engine.

14. The method as recited in claim 7, wherein the costs of operating the at least one electric drive include a cost of generating a positive torque using the at least one electric device and a cost of charging the at least one energy storage device using the at least one electric device.

* * * * *